(12) United States Patent
Koch et al.

(10) Patent No.: US 11,041,748 B2
(45) Date of Patent: Jun. 22, 2021

(54) LEVEL SENSORS HAVING CONDUCTIVE TARGET MOVEMENT SENSING

(71) Applicant: FISHER CONTROLS INTERNATIONAL LLC, Marshalltown, IA (US)

(72) Inventors: Tom Koch, Marshalltown, IA (US); Davin Nicholas, Bondurant, IA (US); Benjamin Koch, Marshalltown, IA (US); Kurtis K. Jensen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 16/593,682

(22) Filed: Oct. 4, 2019

(65) Prior Publication Data
US 2021/0102830 A1    Apr. 8, 2021

(51) Int. Cl.
| G01F 23/36 | (2006.01) |
| G01F 23/38 | (2006.01) |
| G01B 7/00 | (2006.01) |
| F16C 11/04 | (2006.01) |
| G01D 5/14 | (2006.01) |
| G01B 7/14 | (2006.01) |

(52) U.S. Cl.
CPC ............ *G01F 23/363* (2013.01); *F16C 11/04* (2013.01); *G01B 7/003* (2013.01); *G01B 7/14* (2013.01); *G01D 5/14* (2013.01); *G01F 23/38* (2013.01)

(58) Field of Classification Search
CPC .............................. G01F 23/363; G01F 23/38
See application file for complete search history.

(56) References Cited

U.S. PATENT DOCUMENTS

| 2015/0369648 A1* | 12/2015 | Bertalan | ................. G01F 23/36 73/313 |
| 2020/0055491 A1* | 2/2020 | Van Wyk | ................. B67D 7/36 |
| 2020/0121516 A1* | 4/2020 | Ohashi | ................. A61F 13/42 |

\* cited by examiner

*Primary Examiner* — Paul M. West
(74) *Attorney, Agent, or Firm* — Hanley, Flight & Zimmerman, LLC

(57) ABSTRACT

Level sensors having conductive target movement sensing are disclosed. An example level sensor includes a lever operatively coupled to a sensing member, a target operatively coupled to the lever, where the target includes a conductor, an inductive coil to generate a magnetic field and measure feedback signatures associated with the target and the magnetic field, and a processor to calculate a position of the sensing member based on the feedback signatures.

25 Claims, 8 Drawing Sheets

US 11,041,748 B2

LEVEL SENSORS HAVING CONDUCTIVE TARGET MOVEMENT SENSING

FIELD OF THE DISCLOSURE

This disclosure relates generally to sensors and, more particularly, to level sensors having conductive target movement sensing.

BACKGROUND

A level sensor is typically utilized in process control systems to vary or maintain an amount of fluid stored in a tank. In particular, the level sensor includes a buoyant floating device that is operatively coupled to a switch. Based on movement of the aforementioned buoyant floating device, the switch is controlled to operate a valve fluidly coupled to the tank to maintain or adjust a level of the fluid in the tank.

SUMMARY

An example level sensor includes a lever operatively coupled to a sensing member, a target operatively coupled to the lever, where the target includes a conductor, an inductive coil to generate a magnetic field and measure feedback signatures associated with the target and the magnetic field, and a processor to calculate a position of the sensing member based on the feedback signatures.

An example method of determining a position of a sensing member of a level sensor includes providing current to an inductive coil to generate a magnetic field for a target, where the target is operatively coupled to a lever moved by the sensing member, and where the target has a conductor thereon. The method also includes obtaining, via the inductive coil, feedback signatures associated with the target and the magnetic field, and calculating, by executing instructions with at least one processor, the position of the sensing member based on the feedback signatures.

An example non-transitory machine readable medium comprises instructions stored thereon, where the instructions, which when executed, cause a processor to at least cause an inductive coil to generate a magnetic field, determine feedback signatures associated with the magnetic field and a target moved by a sensing member of a level sensor, where the target includes a conductor thereon, and calculate a position of the sensing member based on the feedback signatures.

Figure 1:
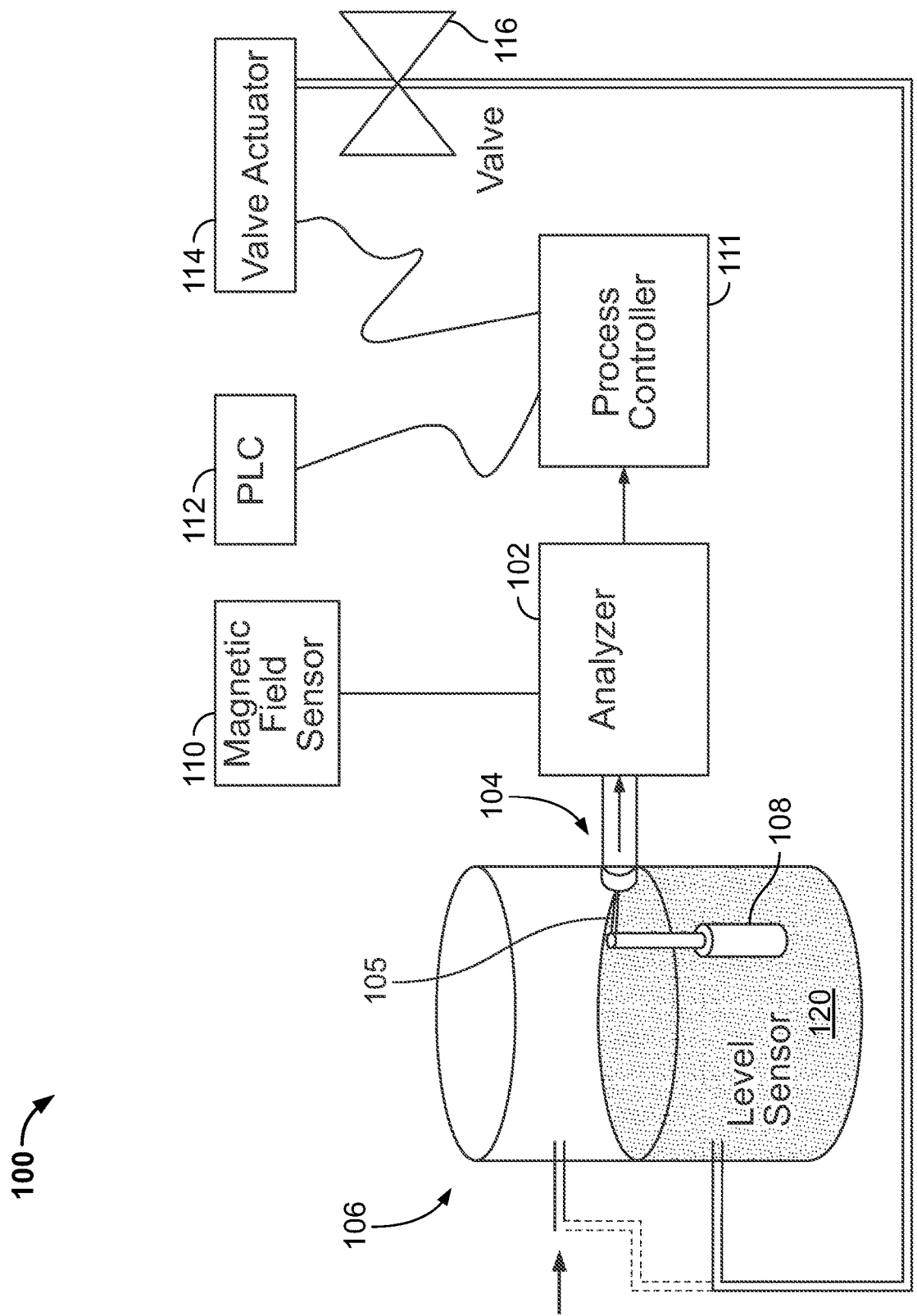
FIG. 1 is a schematic illustration of an example level sensing system in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Level sensors having conductive target movement sensing are disclosed. Known level sensors are typically used to control an amount of fluid (e.g., liquid) stored in a tank. Typically, a flotation device of the level sensor is operatively coupled to a switch that controls a fluid valve. In particular, the fluid valve is operated by the switch to control a fluid level of the tank by filling or draining the tank. However, these known level sensors can be susceptible to wear or long-term drift over time due to implementation of numerous mechanical components and/or moving parts.

Examples disclosed herein enable accurate and reliable positional sensing of a sensing member (e.g., a floating member, a floating bob, a floater, etc.) that is affixed to a lever. In particular, the lever includes a target with a conductor (e.g., a printed conductor, a patterned conductor, a coiled target, a printed coil pattern, etc.) defined thereon. According to examples disclosed herein, a magnetic field is generated by at least one inductive coil (e.g., multiple inductive coils generating an overlapping inductive field) and resultant feedback signatures related to the target and the magnetic field are measured by the inductive coil(s) and/or magnetic field sensors as the target is moved (e.g., rotationally moved, translatably moved, etc.) and/or displaced along with the lever and the sensing member. In turn, the feedback signatures and/or changes in the feedback signatures are analyzed to calculate a position and/or displacement of the sensing member. In other words, movement of the target is measured and/or analyzed via feedback signatures or changes thereof to calculate a degree of movement of the sensing member.

Examples disclosed herein can readily adapt and/or calibrate movement of the lever and/or the sensing member with little or no mechanical adjustment. Further, examples disclosed herein also enable quick and relatively easy adjustment and setting of process control parameters (e.g., level calibration data, zero and span values, etc.) due to implementation of a control interface that can readily adapt magnetic field measurements associated with the target to a desired control of associated process control devices, for example. Further, examples disclosed herein enable storage of settings and/or parameters to reduce manual adjustments that are usually necessitated.

In some examples, a valve actuator is adjusted or controlled based on a calculated position and/or displacement of the aforementioned sensing member. In some examples, the lever pivots and/or rotates about an axis to move the target. Additionally or alternatively, the lever moves in a translational motion. In some examples, the target includes a conductor that is generally triangular or crescent shaped. Additionally or alternatively, the target includes an etched copper conductor, which is defined on a printed board (e.g., a printed circuit board, an unpowered board, etc.).

As used herein, the term "sensing member" refers to a component, assembly and/or device that moves to sense a condition. Accordingly, the "sensing member" can move in a rotational and/or translational motion. As used herein, the term "feedback signature" refers to a resultant signal and/or parameter that characterizes an effect from a generated magnetic field. Accordingly, the term "feedback signature" can relate to a signal reflected, altered and/or varied by a conductor that is actively powered or unpowered.

FIG. 1 is a schematic illustration of an example level sensing system 100 in accordance with teachings of this disclosure. The level sensing system 100 of the illustrated example includes an analyzer 102, and a sensor 104, which includes a lever 105 that extends into a tank 106. The level sensing system 100 also includes a sensing member (e.g., a floating member, a floating bob, a displacer, etc.) 108 operatively coupled to the lever 105 and disposed within the tank 106, a magnetic field sensor (e.g., a magnetic field sensor array, etc.) 110, a process controller (e.g., conditioning electronics) 111, a programmable logic controller (PLC) 112, and a valve actuator 114 that is operatively coupled to a valve 116.

In operation, fluid 120 in the tank 106 displaces the sensing member 108, thereby causing the lever 105 of the sensor 104 to move. In turn, the movement of the lever 105 is measured by the magnetic field sensor 110. Based on the movement of the lever 105, the analyzer 102 of the illustrated example determines a fluid height and/or an amount of the fluid 120 within the tank 106. The example process controller 111 directs and/or controls the valve actuator 114 and, in turn, the valve 116 based on a desired amount of the fluid 120 to be stored in the tank 106. In particular, the valve 116 controls a degree to which the fluid 120 enters the tank 106. Additionally or alternatively, the valve 116 controls a degree to which the fluid 120 is drained from the tank 106.

To control set point parameters and/or calibration associated with the analyzer 102, the sensor 104, the valve actuator 114 and/or the valve 116, the example PLC 112 can be implemented to set and/or define parameters, instructions, etc. associated with the process controller 111. In some examples, programmable functions (e.g., functions based on detected conditions, desired settings, selected configurations and/or sensor data) are stored by and/or executed by the PLC 112.

In some examples, the magnetic field sensor 110 and the analyzer 102 are integral. In some such examples, the magnetic field sensor 110 may be placed onto a circuit board of the analyzer 102 as at least one discrete component. While the valve 116 is shown in this example, any other appropriate process control device (e.g., a fluid regulator, a pressure regulator, a fluid/hydraulic switch, etc.) can be implemented instead. Moreover, examples disclosed herein can be applied to any other appropriate application involving motion or position sensing.

Figure 2:
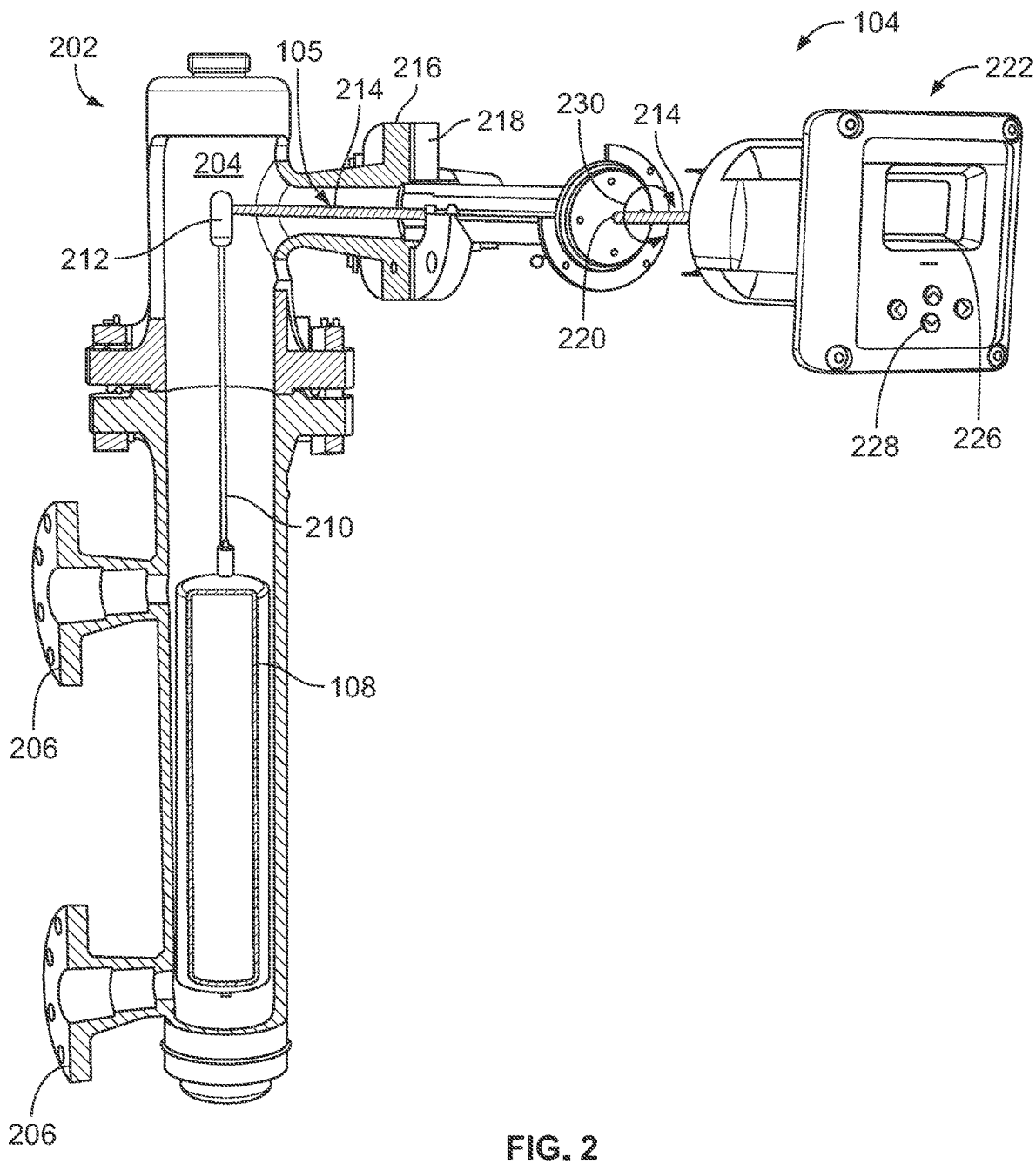
FIG. 2 is a partial cutaway view of an example level sensor of the example level sensing system of FIG. 1.

FIG. 2 is a partial cutaway view of an example level sensor 104 of the example level sensing system 100 of FIG. 1. In the illustrated example, the level sensor 104 includes a housing 202 defining an internal cavity 204, mounts 206, the sensing member 108, a stem 210, a movement translator (e.g., a movement differential, a pivot, a pivot differential, etc.) 212, and the lever 105, which is implemented as an arm 214 in this example. Further, the example level sensor 104 includes mounts 216, 218, a flange mount 220, and an indicator (e.g., a control panel, a user interface, etc.) 222. The indicator 222 of the illustrated example includes a display 226 and a user input interface 228.

To move the arm 214, buoyancy of the sensing member 108 in the fluid 120 shown in FIG. 1 causes a movement of the sensing member 108 along with the stem 210. In turn, the movement translator 212 of the illustrated example causes a translational (e.g., a pivoting, linear) or rotational motion of the arm 214, as generally indicated by a double arrow 230 (e.g., when the arm 214 is implemented as a torque tube). In other words, linear and/or rotational movement of the sensing member 108 is translated to movement of the arm 214, which can be either translation or rotational, due to the movement translator 212.

The example analyzer 102 shown in FIG. 1 determines a position and/or a displacement of the sensing member 108 for a fluid level determination pertaining to the tank 106 based on (i.e., indirectly based on) a movement of the arm 214. As will be discussed in greater detail below in connection with FIGS. 3-8, a target (e.g., a conductive target, a printed target, an etched target, etc.) 302 (shown in FIG. 3) is operationally coupled to the arm 214 and, thus, moves along with the arm 214 as the sensing member 108 is displaced. In turn, a magnetic field measurement pertaining to the target 302 is used to determine the position and/or the displacement of the sensing member 108.

Figure 3:
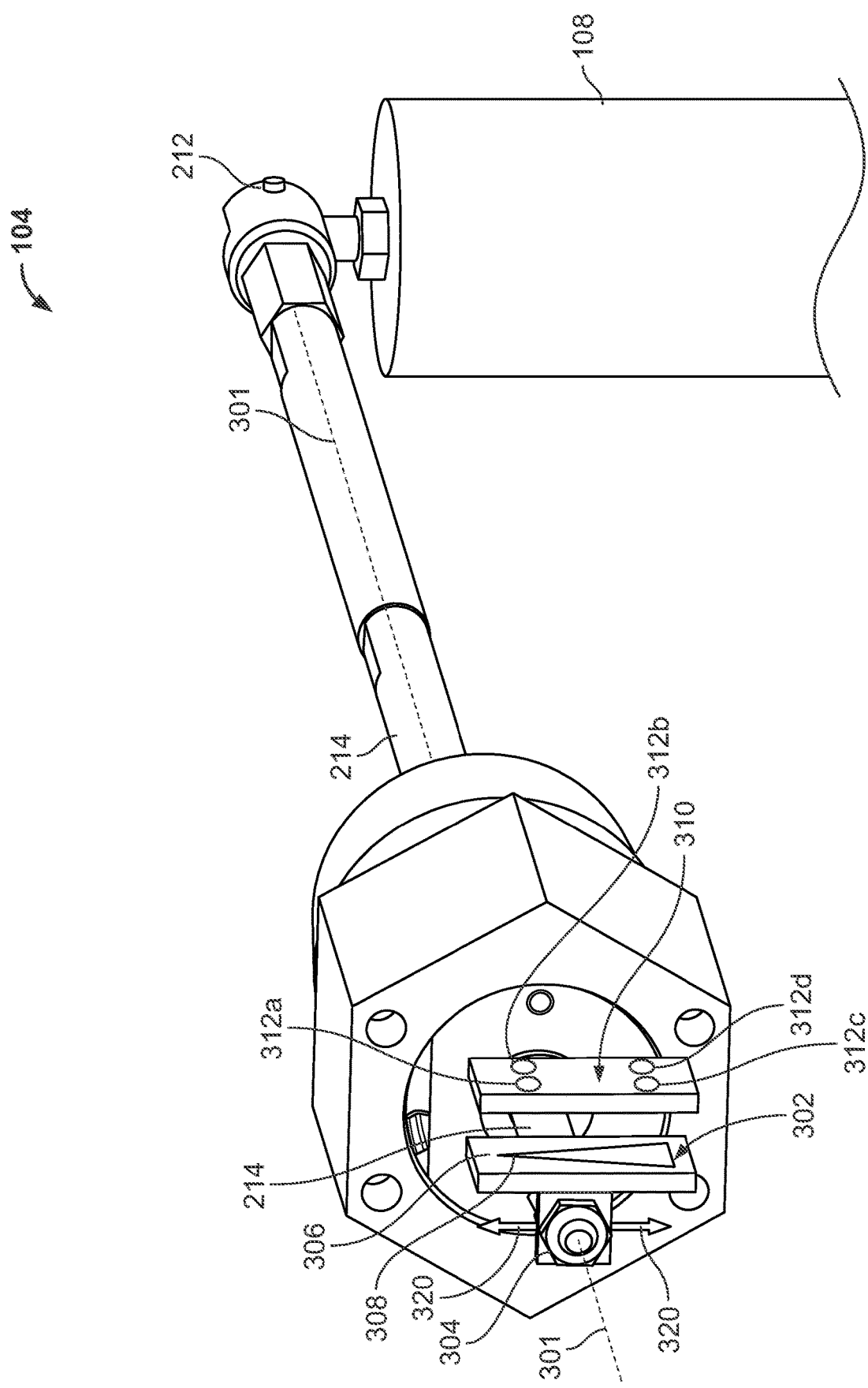
FIG. 3 is a detailed view of a portion of the example level sensor of FIG. 2.

FIG. 3 is a detailed view of a portion of the example level sensor 104 of FIG. 2. In the illustrated view of FIG. 3, the sensing member 108 is shown with the movement translator 212 and the arm 214 having a corresponding longitudinal axis 301. The aforementioned example target 302 is implemented in the magnetic sensor 110 shown in FIG. 1 and mounted to a pivot 304, which is positioned at a distal end of the arm 214 in this example. The example target 302 includes an unpowered board (e.g., a printed circuit board, a wired board, etc.) 306 with a conductor (e.g., a conductor, a printed pattern, a metal pattern, an etched pattern, etc.) 308. Further, a coil array (e.g., an inductive coil array) 310 is shown positioned proximate the example target 302 and includes coils (e.g., inductive coils, inductive elements, etc.) 312 (hereinafter 312a, 312b, 312c, 312d, etc.). The example coil array 310 is implemented in the magnetic field sensor 110 shown in FIG. 1.

To measure a degree of movement of the arm 214 and, thus, the sensing member 108, the coils 312a, 312b, 312c, 312d of the example coil array 310 generate a magnetic field with overlapping inductive fields. Accordingly, movement of the conductor 308 relative to the coils 312a, 312b, 312c, 312d, as generally indicated by arrows 320, causes a variance in magnetic field measurements obtained by the coils 312a, 312b, 312c, 312d. In turn, feedback signatures associated with this variance are utilized to calculate a movement of the target 302 and, thus, the sensing member 108. The feedback signatures may be based on mutual inductance that is varied by relative movement between the target 302 and the conductor 308. As will be discussed in greater detail below in connection with FIGS. 4A and 4B, the conductor 308 is shaped to vary and/or affect resultant feedback signatures corresponding to the magnetic field generated by the coils 312a, 312b, 312c, 312d. Further, the movement and/or position of the sensing member 108 is calculated based on a known relationship (e.g., a known kinematic relationship) between the sensing member 108 and the target 302.

While four of the coils 312 are shown in this example, any appropriate number of the coils 312 can be implemented instead (e.g., one, two, three, five, ten, fifty, one hundred, etc.) depending on a desired accuracy and/or relevant degrees of motion. In this example, the coils 312 are at least partially composed of etched copper and the board 306 is implemented as a printed board (e.g., a printed circuit board, etc.) with the conductor 308 printed or etched thereon. However, any appropriate other materials and/or structural configurations can be implemented instead. In some examples, a single target is used to determine both linear and rotational movements of the arm 214. In some other examples, the target 302 is disposed in the tank 106 while the coils 312 are positioned external to the tank 106.

Figure 4A:
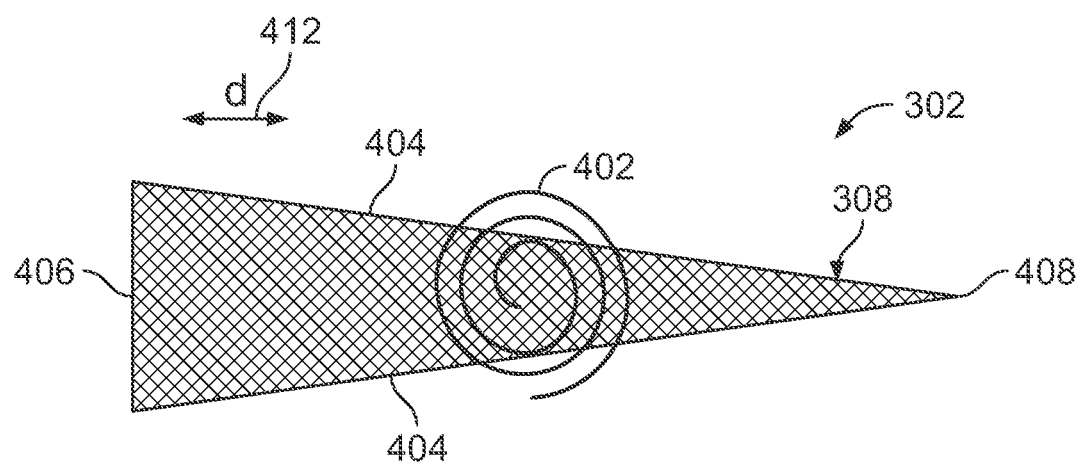
FIGS. 4A and 4B depict example targets that can be implemented in examples disclosed herein.
Figure 4B:
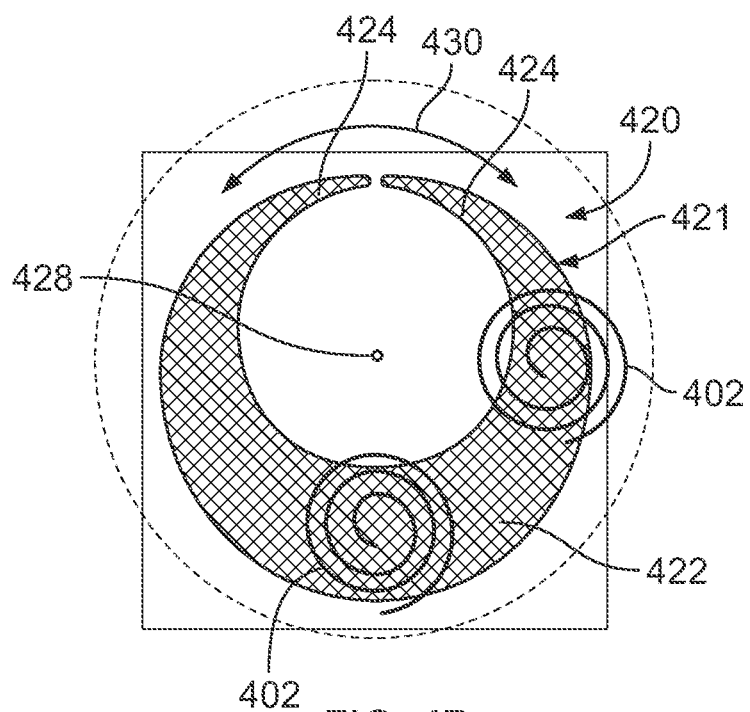

FIGS. 4A and 4B depict example target configurations that can be implemented in examples disclosed herein. Turning to FIG. 4A, the target 302 of FIG. 3 is shown with the conductor 308. In particular, the example target 302 can be used to determine translational (or rotational) movement of the arm 214 (shown in FIGS. 2 and 3). In the illustrated example of FIG. 4A, a coil location 402 represents at least one of the coils 312 is shown relative to an overall shape of the target 302.

The example target 302 of the illustrated example is generally triangularly shaped and includes sides 404, a base 406 and a tip (e.g., a convergence) 408. In this example, movement of the target 302 relative to the coil location 402, as generally indicated by a double arrow 412, varies resultant feedback signatures and/or magnetic fields measured by at least one of the coils 312 and/or the magnetic field sensor 110. In some examples, the aforementioned triangular shape includes rounds at any respective corners.

FIG. 4B depicts an alternative example target 420. The example target 420 is similar to the target 302 of FIGS. 3 and 4A, but is instead implemented to measure rotational movement and/or motion (e.g., of the arm 214). The target 420 includes a pattern 421 that is generally crescent in shape and includes wider portion 422 with narrower distal portions 424. In some examples, the distal portions 424 vary from one another (e.g., in length, in width, etc.) for determination of a rotational direction, for example.

In the illustrated example, the coil locations 402 representing the coils 312a, 312b, 312c, 312d of FIG. 3 are shown relative to the target 420. As the target 420 rotates about an axis 428, as generally indicated by a double arrow 430, the target 420 varies feedback signatures measured at the coils 312a, 312b, 312c, 312d. As a result, a rotational displacement and/or movement of the target 420 can be determined.

In some examples, at least two of the coils 312a, 312b, 312c, 312d are concentrically arranged relative to the axis 428. In other examples, at least two of the coils 312a, 312b, 312c, 312d are spaced at different distances from the axis 428.

While the examples of FIGS. 4A and 4B depict certain target shapes, any appropriate target shapes can be implemented instead (e.g., a rectangular shape, an oval shape, a diamond shape, a polygonal shape, etc.). Further, the examples of FIGS. 4A and 4B can be used in combination with one another (e.g., a hybrid shape thereof).

Figure 5:
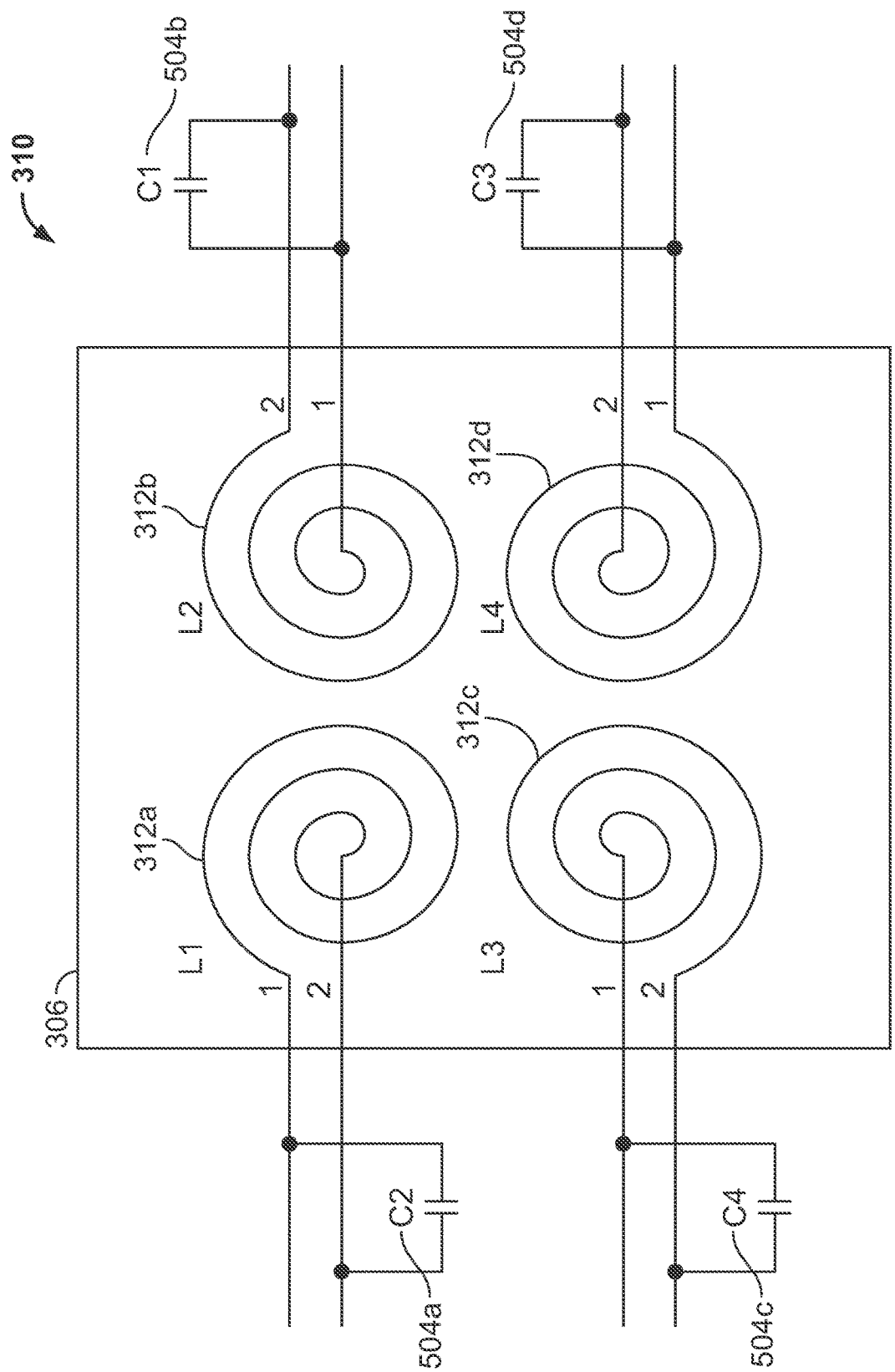
FIG. 5 illustrates an example coil array of FIG. 3.

FIG. 5 illustrates the example inductive coil array 310 of FIG. 3. As can be seen in the illustrated example, the coils 312a, 312b, 312c, 312d are shown arranged in a generally rectangular pattern on the board 306. In this example, the coils 312a, 312b, 312c, 312d are each coupled (e.g., electrically coupled) to respective capacitors 504 (hereinafter 504a, 504b, 504c, 504d, etc.), each of which has a capacitance of approximately 160-200 picofarads (pF) (e.g., 180 pF) in this example. However, any appropriate capacitance value can be implemented instead. In some examples, the capacitors 504a, 504b, 504c, 504d are located on and/or placed onto the board 306. Further, while the board 306 is generally depicted as being rectangular in shape, the board 306 can have an appropriate shape and/or outline (e.g., circular, elliptical, polygonal, etc.).

Figure 6:
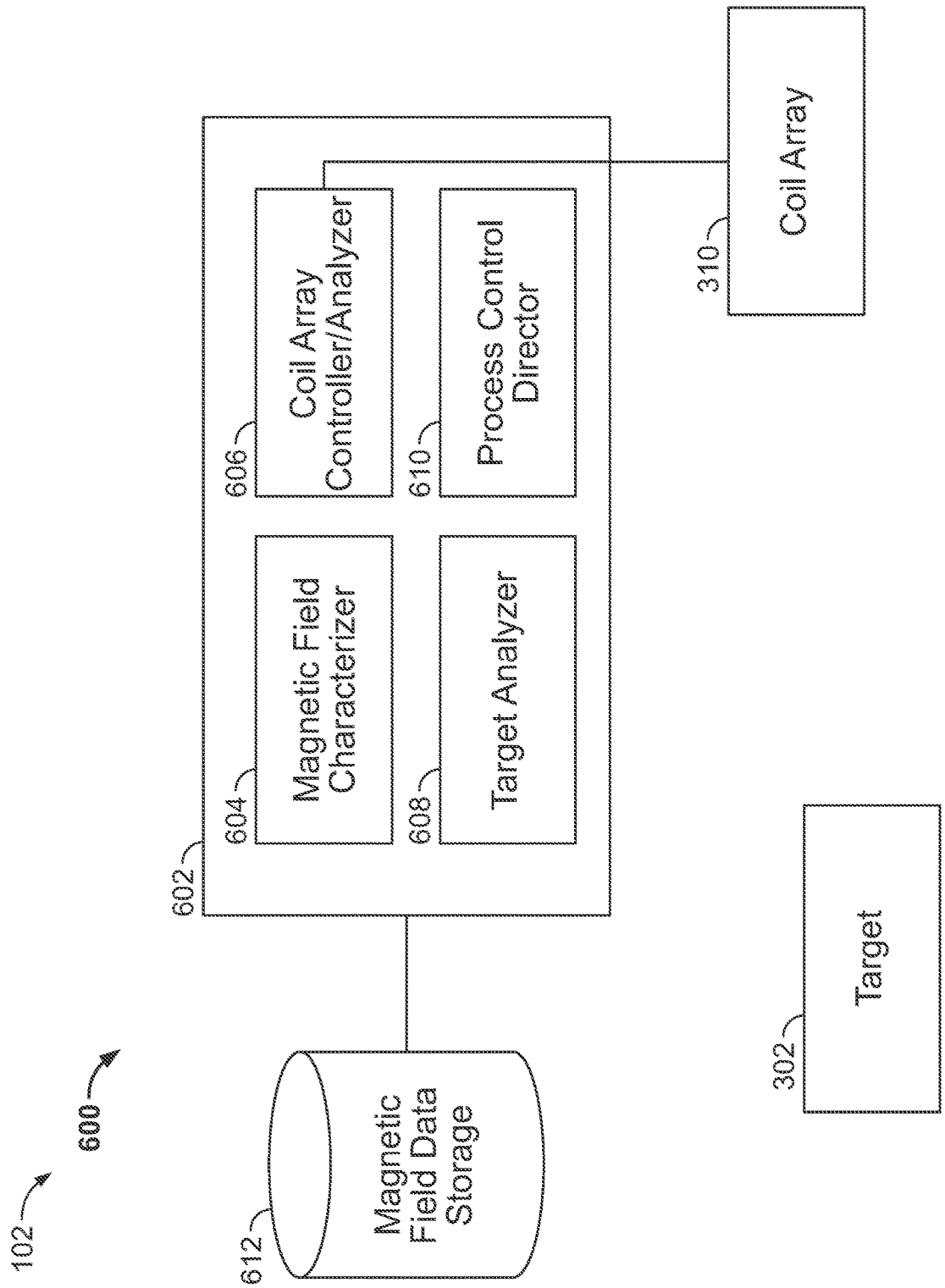
FIG. 6 is a schematic overview of a level sensor analyzer that can be implemented in examples disclosed herein.

FIG. 6 is a schematic overview of a level sensor analyzer 600 that can be implemented in examples disclosed herein. The example level sensor analyzer 600 can be implemented in the analyzer 102, the process controller 111 and/or the PLC 112. In this particular example, the level sensor analyzer 600 is implemented in the analyzer 102. The level sensor analyzer 600 of the illustrated example includes a computational portion 602, which includes a magnetic field characterizer 604, a coil array controller/analyzer 606, a target analyzer 608 and a process control director 610. In some examples, the level sensor analyzer 600 also includes a magnetic field data storage 612, which can be communicatively coupled to the computational portion 602. In this example, the coil array controller/analyzer 606 is communicatively coupled to the coil array 310.

The magnetic field characterizer 604 of the illustrated example determines and/or characterizes feedback signatures measured by the coil array 310. In this example, the magnetic field characterizer 604 utilizes the feedback signatures to calculate or determine a position and/or displacement of the target 302 operatively coupled to the sensing member 108. For example, multiple overlapping fields generated by the coils 312a, 312b, 312c, 312d generate feedback signatures that are obtained by the coils 312a, 312b, 312c, 312d. In particular, the generated magnetic field produces a change in current measured at the coils 312a, 312b, 312c, 312d based on mutual inductance between the conductor 308 and the coils 312a, 312b, 312c, 312d as the target 302 is moved, thereby resulting in the differences in feedback signatures (e.g., measured changes in current). In turn, the differences in the feedback signatures are used to calculate a position and/or a displacement of the target 302 and, thus, the sensing member 108. Additionally or alternatively, the magnetic field characterizer 604 associates a function that relates feedback signatures and/or changes thereof to time-based movements of the sensing member 108 (e.g., a time-based function) to determine the position and/or the displacement of the sensing member 108.

In some examples, the magnetic field characterizer 604 compares measured feedback signatures with stored feedback signatures to calculate the position and/or the displacement of the sensing member 108 and/or the target 302. In some such examples, the stored feedback signatures are associated with known positions (e.g., previously measured positions) of the target 302 (e.g., previously recorded feedback signatures associated with known positions). Additionally or alternatively, differences in current signals measured at the coils 312a, 312b, 312c, 312d define the feedback signatures. In some other examples, current differences between the coils 312a, 312b, 312c, 312d are used to triangulate a position of the target 302.

In the illustrated example, the coil array controller/analyzer 606 controls an amount of current provided to the coils 312. In some examples, the coil array controller/analyzer 606 maintains each of the coils 312 at a relatively similar (e.g., the same, within 1% of one another, etc.) current level. Alternatively, the coil array controller/analyzer 606 controls different current values to be provided to ones of the coils 312. In some examples, the coil array controller/analyzer 606 defines specific ones of the coils 312 to provide current thereto. Additionally or alternatively, the coil array controller/analyzer 606 controls different output phases of respective ones of the coils 312.

The example target analyzer 608 receives magnetic field measurement signals related to the generated magnetic field and converts the signals to feedback signatures and/or data characterizing the feedback signatures. Additionally or alternatively, the target analyzer 608 indicates a differential magnetic field value based on the displacement of the target 302.

In some examples, the process control director 610 is implemented to control the valve actuator 114 and/or the valve 116 based on calibration values and/or programmable instructions received from the PLC 112 shown in FIG. 1. For example, the process control director 610 utilizes a calculated position of the sensing member 108 based on the feedback signatures to control movement of the valve actuator 114 via the process controller 111.

In this example, the magnetic field data storage 612 stores data associated with magnetic field values, feedback signatures, expected measurements, predetermined movement relationships (e.g., between the sensing member 108 and the arm 214) for use in positional and/or movement determinations of the sensing member 108. Additionally or alternatively, the magnetic field data storage 612 stores calibration data (e.g., current calibration data, updated calibration data, etc.) associated with the process controller 111 and/or the process control director 610.

In some examples, a 4-20 milliamp (mA) control signal is provided by the process control director 610 and/or the process controller 111. In some examples, a HART, Fieldbus, Profibus, Profinet and/or OPC protocols are implemented. In some such examples, these communication protocols can be used to store process sensor data (e.g., minimum values, maximum values, average values, mean values, when changes occurred, etc.).

While an example manner of implementing the level sensor analyzer 600 of FIG. 6 is illustrated in FIG. 6, one or more of the elements, processes and/or devices illustrated in FIG. 6 may be combined, divided, re-arranged, omitted, eliminated and/or implemented in any other way. Further, the example process controller 111, the example magnetic field characterizer 604, the example coil array controller/analyzer 606, the example target analyzer 608 and the example process control director 610 and/or, more generally, the example level sensor analyzer 600 of FIG. 6 may be implemented by hardware, software, firmware and/or any combination of hardware, software and/or firmware. Thus, for example, any of the example process controller 111, the example magnetic field characterizer 604, the example coil array controller/analyzer 606, the example target analyzer 608, the example process control director 610 and/or, more generally, the example level sensor analyzer 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example process controller 111, magnetic field characterizer 604, the example coil array controller/analyzer 606, the example target analyzer 608, and/or the example process control director 610 is/are hereby expressly defined to include a non-transitory computer readable storage device or storage disk such as a memory, a digital versatile disk (DVD), a compact disk (CD), a Blu-ray disk, etc. including the software and/or firmware. Further still, the example level sensor analyzer 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
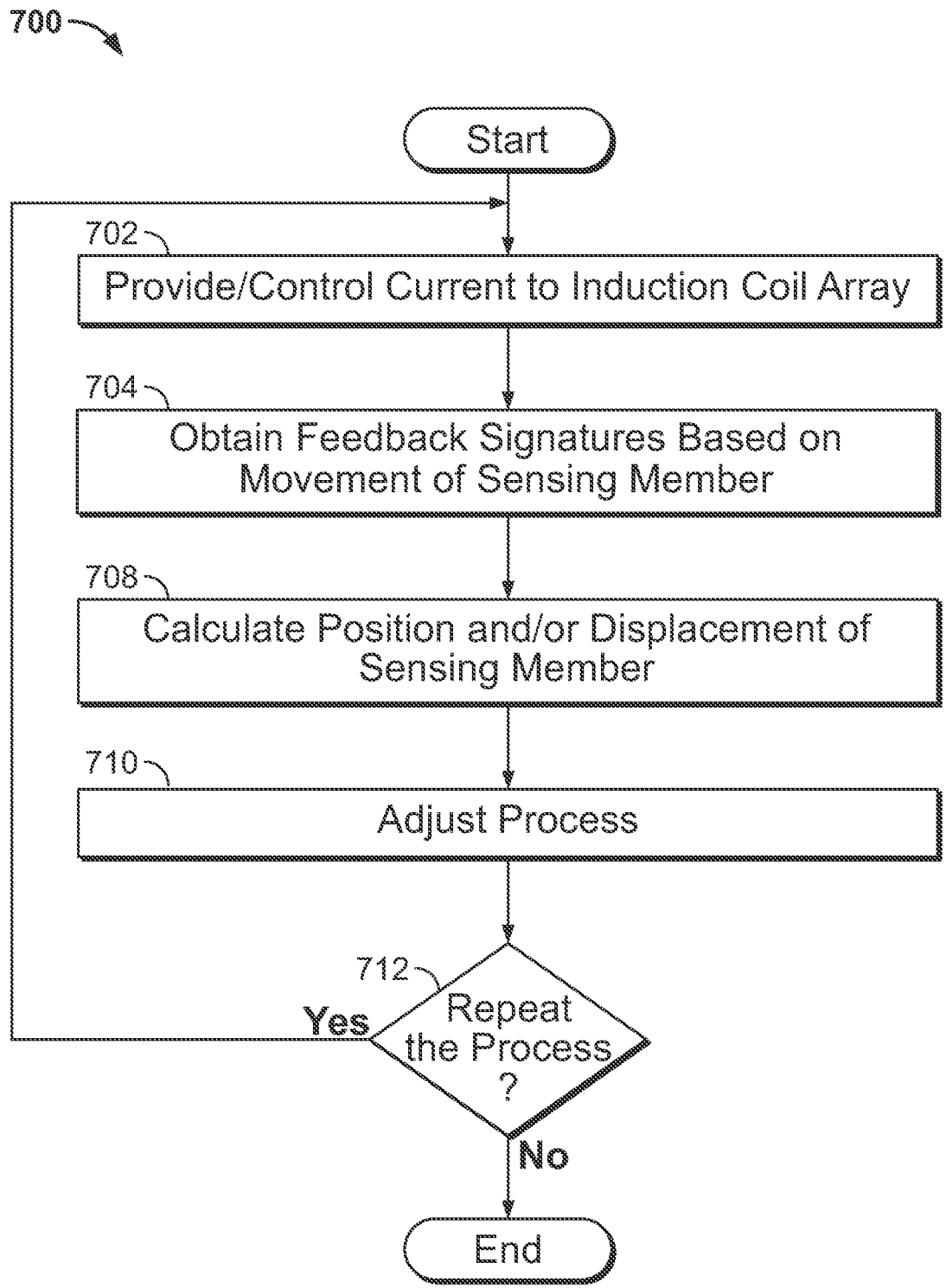
FIG. 7 is a flowchart representative of machine readable instructions which may be executed to implement examples disclosed herein

A flowchart representative of example hardware logic, machine readable instructions, hardware implemented state machines, and/or any combination thereof for implementing the level sensor analyzer 600 of FIG. 6 is shown in FIG. 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example level sensor analyzer 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 700 of FIG. 7 begins as a level of the fluid 120 disposed in the tank 106 is being measured (e.g., periodically measured) and controlled by operating the valve 116 via the valve actuator 114.

At block 702, in some examples, the coil array controller/analyzer 606 controls and/or provides an amount of current to the coils 312 of the coil array 310. In some examples, the amount of current provided is varied based on a desired accuracy and/or to vary a detection range associated with the target 302.

At block 704, the target analyzer 608 directs and/or communicates with the magnetic field sensor 110 to obtain feedback signatures associated with a displacement and/or movement of the target 302. Additionally or alternatively, a magnetic field value and/or feedback signature differential (e.g., a change in at least one magnetic field measurement over time) associated with the target 302 is measured.

At block 708, the magnetic field characterizer 604 calculates a position and/or a displacement of the sensing member 108 based on the aforementioned feedback signatures and/or a change in the feedback signatures. The feedback signatures may pertain to changes in measured currents and/or measured current differentials. In this example, the magnetic field characterizer 604 determines a rotational or translational displacement of the target 302 to calculate a position of the sensing member 108 (e.g., based on known mechanical or kinematic relationships). In some examples, the magnetic field characterizer 604 queries expected magnetic field measurements and/or functions from the magnetic field data storage 612 to determine/calculate the displacement of the sensing member 108 based on movement of the target 302.

At block 710, the process control director 610 of the illustrated example adjusts a process based on the calculated position and/or displacement of the sensing member 108. In this example, the process control director 610 directs the process controller 111 to move the valve actuator 114 accordingly.

At block 712, it is determined whether to repeat the process. If the process is to be repeated (block 712), control of the process returns to block 702, Otherwise, the process ends.

Figure 8:
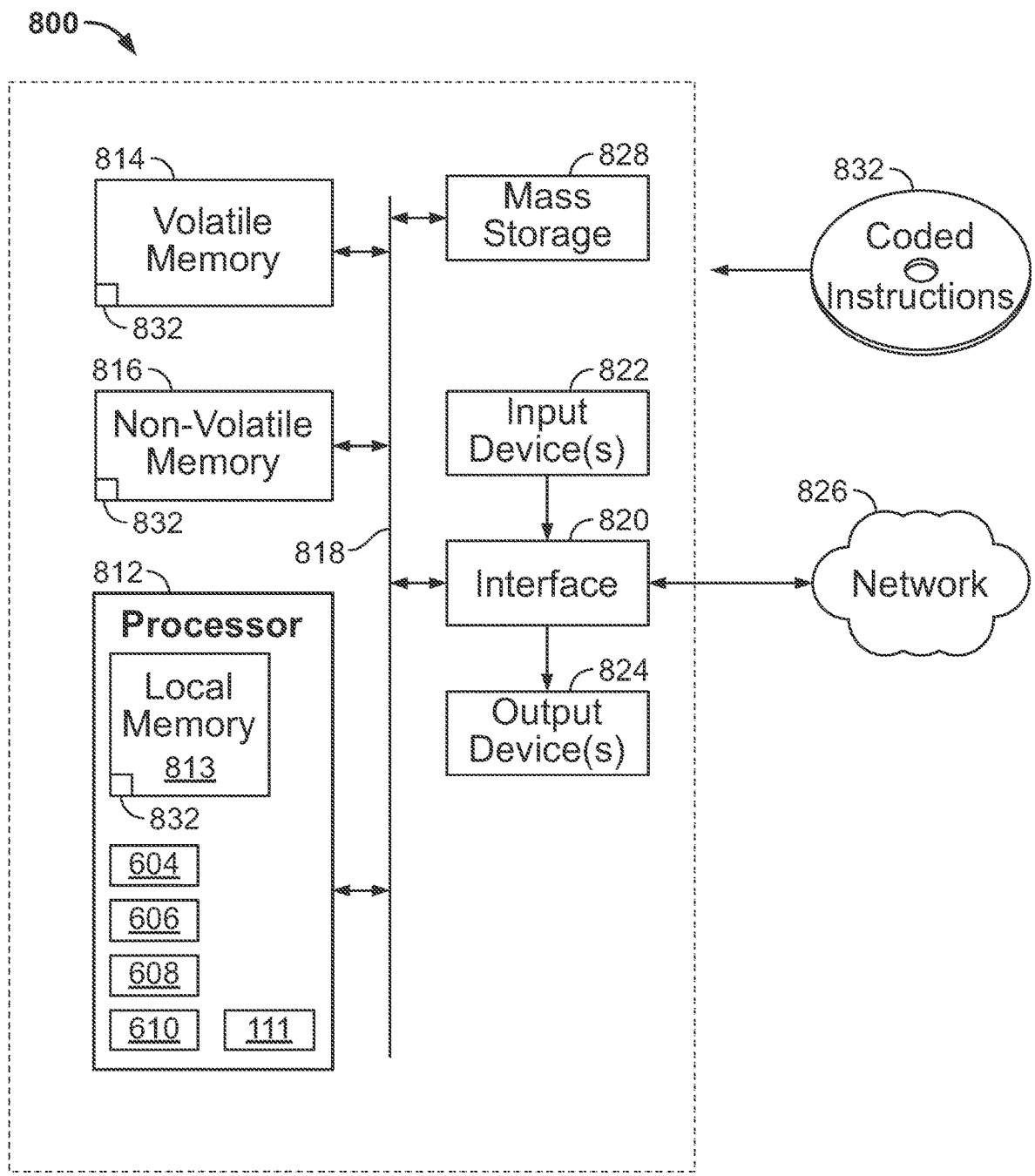
FIG. 8 is a block diagram of an example processing platform structured to execute the instructions of FIG. 7 to implement the example level sensing system of FIG. 1 and/or the example level sensor analyzer of FIG. 6.

FIG. 8 is a block diagram of an example processor platform 800 structured to execute the instructions of FIG. 7 to implement the level sensor analyzer 600 of FIG. 6. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example magnetic field characterizer 604, the example coil array controller/analyzer 606, the example target analyzer 608, the example process control director 610 and the process controller 111.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

Example 1 includes a level sensor having a lever operatively coupled to a sensing member, a target operatively coupled to the lever, where the target includes a conductor, an inductive coil to generate a magnetic field and measure feedback signatures associated with the target and the magnetic field, and a processor to calculate a position of the sensing member based on the feedback signatures.

Example 2 includes the level sensor as defined in example 1, further including a valve actuator communicatively coupled to the processor.

Example 3 includes the level sensor as defined in example 2, where the valve actuator controls a valve to provide fluid to a tank in which the sensing member is at least partially disposed.

Example 4 includes the level sensor as defined in example 1, where the lever is to rotate at a pivot based on movement of the sensing member.

Example 5 includes the level sensor as defined in example 1, where the sensing member includes a float to be disposed in a tank to store fluid.

Example 6 includes the level sensor as defined in example 5, where the target is disposed in the tank.

Example 7 includes the level sensor as defined in example 1, where the conductor of the target includes a printed pattern.

Example 8 includes the level sensor as defined in example 7, where the printed pattern includes at least one of a triangular shape or a crescent shape.

Example 9 includes a method of determining a position of a sensing member of a level sensor. The method includes providing current to an inductive coil to generate a magnetic field for a target, where the target is operatively coupled to a lever moved by the sensing member, and where the target has a conductor thereon. The method also includes obtaining, via the inductive coil, feedback signatures associated with the target and the magnetic field, and calculating, by executing instructions with at least one processor, the position of the sensing member based on the feedback signatures.

Example 10 includes the method as defined in example 9, further including adjusting, by executing instructions with the at least one processor, a process control device based on the calculated position.

Example 11 includes the method as defined in example 10, where the process control device includes a valve to control an amount of fluid in a tank in which the sensing member is disposed.

Example 12 includes the method as defined in example 9, further including determining, by executing instructions with the at least one processor, zero and span values associated with the sensing member based on the feedback signatures.

Example 13 includes the method as defined in example 9, further including comparing the feedback signatures to known feedback signatures to calculate the position of the sensing member.

Example 14 includes the method as defined in example 9, where the position is calculated based on differences between the feedback signatures.

Example 15 includes a non-transitory machine readable medium comprises instructions stored thereon, where the instructions, which when executed, cause a processor to at least cause an inductive coil to generate a magnetic field, determine feedback signatures associated with the magnetic field and a target moved by a sensing member of a level sensor, where the target includes a conductor thereon, and calculate a position of the sensing member based on the feedback signatures.

Example 16 includes the non-transitory machine readable medium as defined in example 15, where the instructions cause the processor to control a process control device based on the calculated position.

Example 17 includes the non-transitory machine readable medium as defined in example 15, where the position is calculated based on changes of the feedback signatures.

Example 18 includes the non-transitory machine readable medium as defined in example 15, where the instructions cause the processor to determine zero and span values associated with the sensing member based on the feedback signatures.

Example 19 includes the non-transitory machine readable medium as defined in example 15, where the instructions cause the processor to compare the feedback signatures to known feedback signatures that correspond to known positions of the sensing member to calculate the position.

Example 20 includes the non-transitory machine readable medium as defined in example 15, where the position is calculated based on a known kinematic relationship of the sensing member to the target.

From the foregoing, it will be appreciated that example methods, apparatus and articles of manufacture have been disclosed that enable robust and accurate sensing of a position and/or displacement of a sensing member (e.g., a floating member for a level sensor). Examples disclosed herein enable reduction and/or elimination of moving parts, which can be susceptible to wear or degradation over time. Examples disclosed herein enable easy and quick adjustment of process parameters and/or calibration parameters associated with process control systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A level sensor comprising:
a lever operatively coupled to a sensing member;
a target operatively coupled to the lever, wherein the target includes a conductor;
first, second, third and fourth inductive coils to generate a magnetic field and measure feedback signatures associated with the target and the magnetic field, the first, second, third and fourth inductive coils positioned in a rectangular arrangement, the target to move in a translational motion with respect to the first, second, third and fourth inductive coils; and
a processor to calculate a position of the sensing member based on the feedback signatures.

2. The level sensor as defined in claim 1, further including a valve actuator communicatively coupled to the processor.

3. The level sensor as defined in claim 2, wherein the valve actuator controls a valve to provide fluid to a tank in which the sensing member is at least partially disposed.

4. The level sensor as defined in claim 1, wherein the lever is to rotate at a pivot based on movement of the sensing member.

5. The level sensor as defined in claim 1, wherein the sensing member includes a float to be disposed in a tank to store fluid.

6. The level sensor as defined in claim 5, wherein the target is disposed in the tank.

7. The level sensor as defined in claim 1, wherein the conductor of the target includes a printed pattern.

8. The level sensor as defined in claim 7, wherein the printed pattern includes at least one of a triangular shape or a crescent shape.

9. The level sensor of claim 7, wherein the printed pattern includes a triangle.

10. The level sensor of claim 9, wherein the target is to translate between a base of the triangle and a tip of the triangle.

11. The level sensor of claim 1, wherein the first, second, third and fourth inductive coils are electrically coupled to respective capacitors.

12. A method of determining a position of a sensing member of a level sensor, the method comprising:
providing current to first, second, third and fourth inductive coils to generate a magnetic field for a target, the first, second, third and fourth inductive coils positioned in a rectangular arrangement, the target operatively coupled to a lever moved by the sensing member, the target having a conductor thereon, the target to move in a translational motion with respect to the first, second, third and fourth inductive coils;
obtaining, via at least one of the first, second, third and fourth inductive coils, feedback signatures associated with the target and the magnetic field; and
calculating, by executing instructions with at least one processor, the position of the sensing member based on the feedback signatures.

13. The method as defined in claim 12, further including adjusting, by executing instructions with the at least one processor, a process control device based on the calculated position.

14. The method as defined in claim 13, wherein the process control device includes a valve to control an amount of fluid in a tank in which the sensing member is disposed.

15. The method as defined in claim 12, further including determining, by executing instructions with the at least one processor, zero and span values associated with the sensing member based on the feedback signatures.

16. The method as defined in claim 12, further including comparing the feedback signatures to known feedback signatures to calculate the position of the sensing member.

17. The method as defined in claim 12, wherein the position is calculated based on differences between the feedback signatures.

18. The method as defined in claim 12, wherein the first, second, third and fourth inductive coils are electrically coupled to respective capacitors.

19. A non-transitory machine readable medium comprising instructions stored thereon, wherein the instructions, which when executed, cause a processor to at least:
cause first, second, third and fourth coils to generate a magnetic field, the first, second, third and fourth inductive coils positioned in a rectangular arrangement;
determine feedback signatures associated with the magnetic field and a target operatively coupled to a lever moved by a sensing member of a level sensor, the target having a conductor thereon, the target to move in a translational motion with respect to the first, second, third and fourth inductive coils; and
calculate a position of the sensing member based on the feedback signatures.

20. The non-transitory machine readable medium as defined in claim 19, wherein the instructions cause the processor to control a process control device based on the calculated position.

21. The non-transitory machine readable medium as defined in claim 19, wherein the position is calculated based on changes of the feedback signatures.

22. The non-transitory machine readable medium as defined in claim 19, wherein the instructions cause the processor to determine zero and span values associated with the sensing member based on the feedback signatures.

23. The non-transitory machine readable medium as defined in claim 19, wherein the instructions cause the processor to compare the feedback signatures to known feedback signatures that correspond to known positions of the sensing member to calculate the position.

24. The non-transitory machine readable medium as defined in claim 19, wherein the position is calculated based on a known kinematic relationship of the sensing member to the target.

25. The non-transitory machine readable medium as defined in claim 19, wherein the first, second, third and fourth inductive coils are electrically coupled to respective capacitors.

* * * * *